United States Patent
Yamamichi

(10) Patent No.: US 9,327,354 B2
(45) Date of Patent: May 3, 2016

(54) CUTTING INSERT, CUTTING TOOL, AND METHOD OF PRODUCING MACHINED PRODUCT USING THE SAME

(75) Inventor: Kazuki Yamamichi, Kyoto (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 191 days.

(21) Appl. No.: 14/354,893

(22) PCT Filed: May 30, 2012

(86) PCT No.: PCT/JP2012/063987
§ 371 (c)(1),
(2), (4) Date: Apr. 28, 2014

(87) PCT Pub. No.: WO2013/065347
PCT Pub. Date: May 10, 2013

(65) Prior Publication Data
US 2014/0314509 A1 Oct. 23, 2014

(30) Foreign Application Priority Data
Oct. 31, 2011 (JP) ................................. 2011-239606

(51) Int. Cl.
*B23B 27/00* (2006.01)
*B23C 5/20* (2006.01)
(Continued)

(52) U.S. Cl.
CPC ............ *B23C 5/205* (2013.01); *B23B 27/1607* (2013.01); *B23C 5/06* (2013.01);
(Continued)

(58) Field of Classification Search
CPC .................... B23B 27/141; B23B 2200/0495; B23B 2200/049; B23B 2200/087; B23C 5/06; B23C 5/202
See application file for complete search history.

(56) References Cited

U.S. PATENT DOCUMENTS 6,786,682 B1 * 9/2004 Wiman ................. B23B 27/143
407/114
8,915,681 B2 * 12/2014 Ishi .......................... B23C 5/06
407/113
(Continued)

FOREIGN PATENT DOCUMENTS

CN 101663121 A 3/2010
EP 1 157 768 A1 11/2001
(Continued)

OTHER PUBLICATIONS

International Search Report, PCT/JP2012/063987, Jun. 26, 2012, 2 pgs.
(Continued)

*Primary Examiner* — Will Fridie, Jr.
(74) *Attorney, Agent, or Firm* — Volpe and Koenig, P.C.

(57) ABSTRACT

A cutting insert comprises an upper surface including a first corner, and a second and third corner, respectively, adjacent to both sides of the first corner. The upper surface sequentially includes a rake surface along an upper cutting edge, inclined toward a lower surface, going inward from the upper cutting edge at a rake angle on a basis of a perpendicular plane perpendicular to a central axis extending between the upper and lower surfaces, and a connection surface more inward than the rake surface, inclined toward the lower surface, going inward at a connection angle on the basis of the perpendicular plane. An intersecting part of the rake surface and the connection surface includes a highest position in a portion of the intersecting part corresponding to a minor rake surface. A cutting tool with cutting insert, and a method of producing a machined product using the cutting tool are provided.

15 Claims, 11 Drawing Sheets

(51) Int. Cl.
*B23C 5/06* (2006.01)
*B23B 27/16* (2006.01)
*B23C 5/00* (2006.01)

(52) U.S. Cl.
CPC ............... *B23C 5/202* (2013.01); *B23C 5/207* (2013.01); *B23C 2200/0411* (2013.01); *B23C 2200/205* (2013.01); *B23C 2210/045* (2013.01); *B23C 2210/0457* (2013.01); *Y10T 407/2268* (2015.01); *Y10T 407/235* (2015.01); *Y10T 409/303808* (2015.01)

(56) References Cited

U.S. PATENT DOCUMENTS

| | | | |
|---|---|---|---|
| 2001/0051077 | A1 | 12/2001 | Nagata et al. |
| 2002/0146293 | A1 | 10/2002 | Nelson |
| 2004/0208714 | A1 | 10/2004 | Stabel et al. |
| 2007/0071559 | A1 | 3/2007 | Koskinen |
| 2009/0285646 | A1* | 11/2009 | Oprasic ............ B23C 5/06 407/114 |
| 2010/0034602 | A1* | 2/2010 | Sung ............ B23B 27/141 407/113 |
| 2010/0080662 | A1 | 4/2010 | Satran et al. |
| 2010/0111619 | A1 | 5/2010 | Ballas et al. |
| 2010/0221076 | A1 | 9/2010 | Takahashi et al. |

FOREIGN PATENT DOCUMENTS

| | | |
|---|---|---|
| EP | 1 736 266 A1 | 12/2006 |
| EP | 2 022 584 A1 | 6/2007 |
| JP | 9-117817 A | 5/1997 |
| JP | 2002-046010 A | 2/2002 |
| JP | 2004-090198 A | 3/2004 |
| JP | 2004-314301 A | 11/2004 |
| JP | 2010-523352 A | 7/2010 |
| TW | 516980 B | 1/2003 |
| WO | 2007/142224 A1 | 12/2007 |
| WO | 2008/120186 A1 | 10/2008 |
| WO | 2008/120188 A2 | 10/2008 |
| WO | 2008/120188 A3 | 10/2008 |
| WO | 2011/122676 A1 | 10/2011 |

OTHER PUBLICATIONS

Extended European Search Report, European Patent Application No. 12845723.1, Jul. 7, 2015, 6 pgs.

Chinese Office Action with partial English translation and English concise explanation, Chinese Patent Application No. 201280052995.5, Jun. 3, 2015, 14 pgs.

* cited by examiner

US 9,327,354 B2

CUTTING INSERT, CUTTING TOOL, AND METHOD OF PRODUCING MACHINED PRODUCT USING THE SAME

TECHNICAL FIELD

The present invention relates to a cutting insert, a cutting tool, and a method of producing a machined product using the same.

BACKGROUND ART

Conventionally, a configuration in which a rake surface, a step part, and a seating surface are sequentially located inwardly from a corner cutting edge has been proposed as a cutting plate for use in a face milling process (for example, refer to Japanese Unexamined Patent Publication No. 2004-314301).

However, when the cutting plate of Japanese Unexamined Patent Publication No. 2004-314301 is used under conditions that the depth of cut is small, for example, in finish cut, there is a risk that chips extending without being curled and divided may damage a machined surface of a workpiece.

Hence, there is a need for an insert with excellent chip discharge performance in order to suppress quality deterioration of the machined surface of the workpiece due to the chips as described above.

SUMMARY OF THE INVENTION

An object of the present invention is to provide a cutting insert and a cutting tool each having excellent chip discharge performance, as well as a method of producing a machined product using the cutting insert and the cutting tool.

A cutting insert according to an embodiment of the present invention includes a polygonal shaped upper surface, a lower surface being identical in shape to the upper surface, a side surface connected to each of the upper surface and the lower surface, and an upper cutting edge located at an intersecting part of the upper surface and the side surface. The upper surface includes a first corner, and a second corner and a third corner respectively adjacent to both sides of the first corner. The upper surface sequentially includes a rake surface located along the upper cutting edge and inclined toward the lower surface as going inward from the upper cutting edge at a rake angle on a basis of a perpendicular plane perpendicular to a central axis extending between the upper surface and the lower surface, and a connection surface located more inward than the rake surface and inclined toward the lower surface as going inward at a connection angle on the basis of the perpendicular plane. The upper cutting edge sequentially includes a corner cutting edge, and a minor cutting edge and a major cutting edge each being inclined toward the lower surface on the basis of the perpendicular plane as going away from the corner cutting edge. The corner cutting edge and the minor cutting edge and the major cutting edge are disposed in a direction from the first corner to each of the second corner and the third corner. The rake surface includes a minor rake surface located inwardly of the minor cutting edge and inclined toward the lower surface as going inward at a first rake angle on the basis of the perpendicular plane, a major rake surface located inwardly of the major cutting edge and inclined toward the lower surface as going inward at a second rake angle on the basis of the perpendicular plane, and a corner rake surface located inwardly of the corner cutting edge and inclined toward the lower surface as going inward at a third rake angle on the basis of the perpendicular plane. An intersecting part of the rake surface and the connection surface includes a highest position in a portion of the intersecting part corresponding to the minor rake surface.

A cutting tool according to an embodiment of the present invention includes the cutting insert of the foregoing embodiment, and a holder configured to attach the cutting insert thereto. A cutting section of the upper cutting edge extending from the first corner to the second corner in the cutting insert has a positive axial rake angle.

A method of producing a machined product according to an embodiment of the present invention includes rotating the cutting tool according to the foregoing embodiment on a basis of a rotation axis of the holder, bringing the upper cutting edge of the cutting tool being rotated into contact with a surface of a workpiece, and separating the cutting tool from the workpiece.

With the cutting insert according to the embodiment of the present invention, the upper surface includes the first corner, and the second corner and the third corner respectively adjacent to both sides of the first corner. The upper surface sequentially includes the rake surface located along the upper cutting edge and inclined toward the lower surface as going inward from the upper cutting edge at the rake angle on the basis of the perpendicular plane perpendicular to the central axis extending between the upper and lower surfaces, and the connection surface located more inward than the rake surface and inclined toward the lower surface as going inward at the connection angle on the basis of the perpendicular plane. An intersecting part of the rake surface and the connection surface includes a highest position in a portion of the intersecting part corresponding to the minor rake surface. Therefore, even under the conditions that the corner cutting edge and the minor cutting edge are used mainly and the depth of cut is relatively small, the generated chips can be stably curled by the high portion located on the minor rake surface, thereby exhibiting excellent chip discharge performance.

BRIEF DESCRIPTION OF THE DRAWINGS

FIG. 4(a) is a cross-sectional view taken along line a-a, FIG. 4(b) is a cross-sectional view taken along line b-b, FIG. 4(c) is a cross-sectional view taken along line c-c, FIG. 4(d) is a cross-sectional view taken along line d-d, and FIG. 4(e) is a cross-sectional view taken along line e-e;

FIG. 6(a) is a fragmentary side view taken in the direction of arrow X1, FIG. 6(b) is a cross-sectional view taken along line f-f, and FIG. 6(c) is a cross-sectional view taken along line g-g;

FIG. 8(a) is a view of the cutting insert taken from a side surface thereof, and FIG. 8(b) is a view of the cutting insert taken from an upper surface thereof;

PREFERRED EMBODIMENTS FOR CARRYING OUT THE INVENTION

Cutting Insert

A cutting insert (hereinafter generally referred to as an "insert") according to an embodiment of the present invention is described in details below with reference to FIGS. 1 to 6, taking the insert 1 having a hexagonal shape in a top view as an example.

Figure 1A:
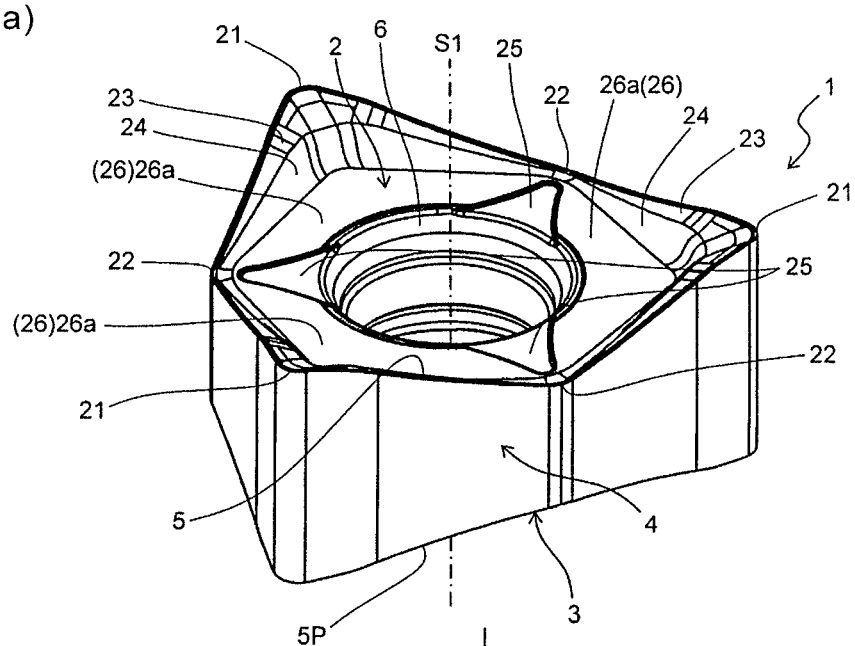
FIG. 1(a) is a perspective view of a cutting insert according to an embodiment of the present invention.
Figure 1B:
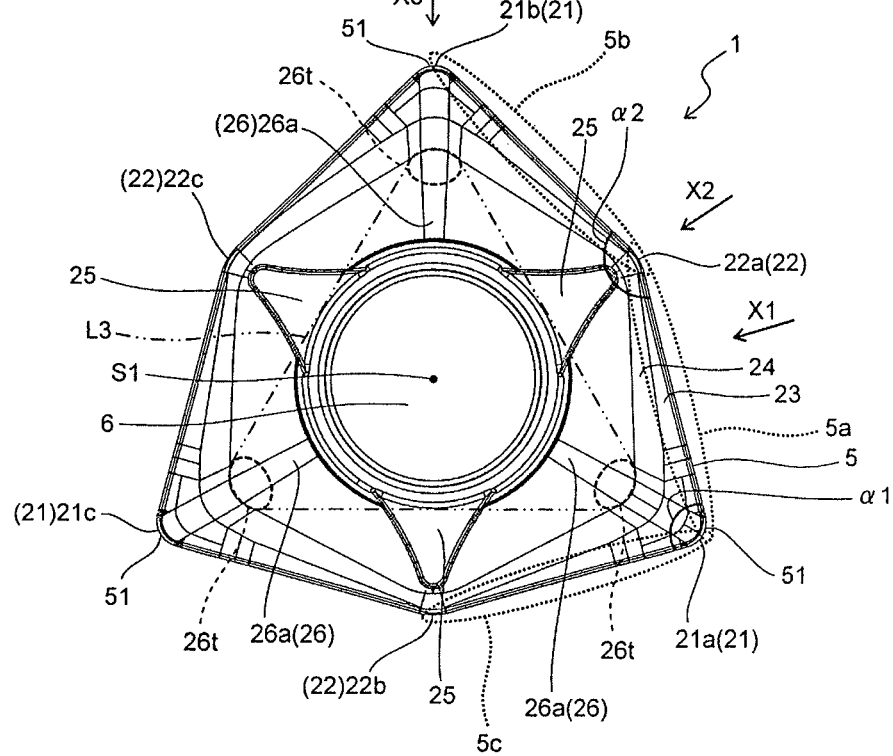
FIG. 1(b) is a plan view (top view) thereof.
Figure 2A:
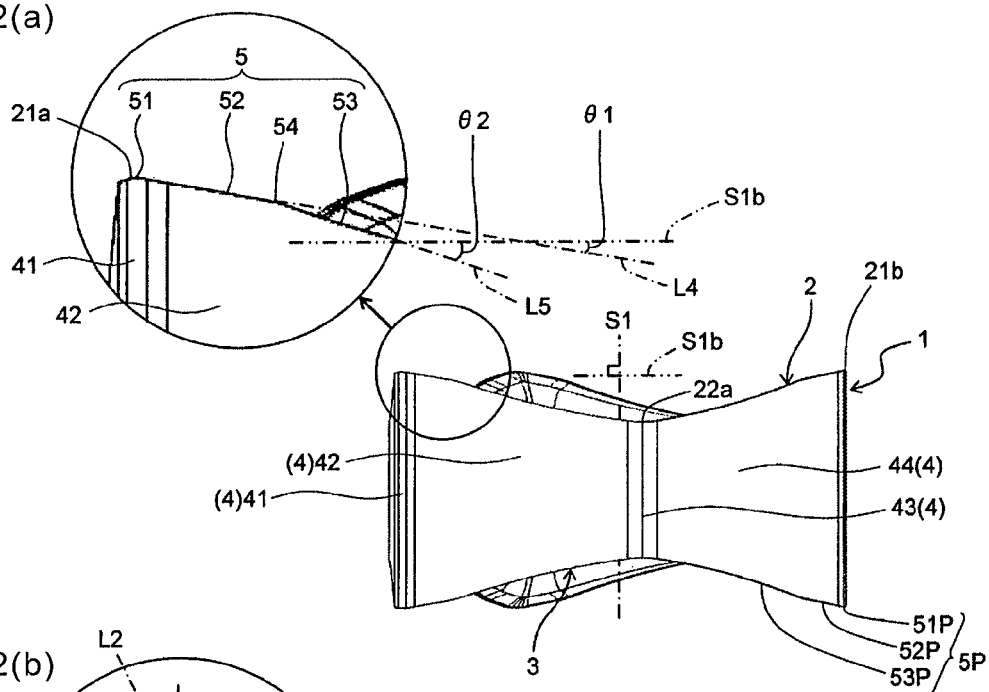
FIG. 2(a) is a side view of the cutting insert shown in FIG. 1, specifically a fragmentary view taken in the direction of arrow X1.
Figure 2B:
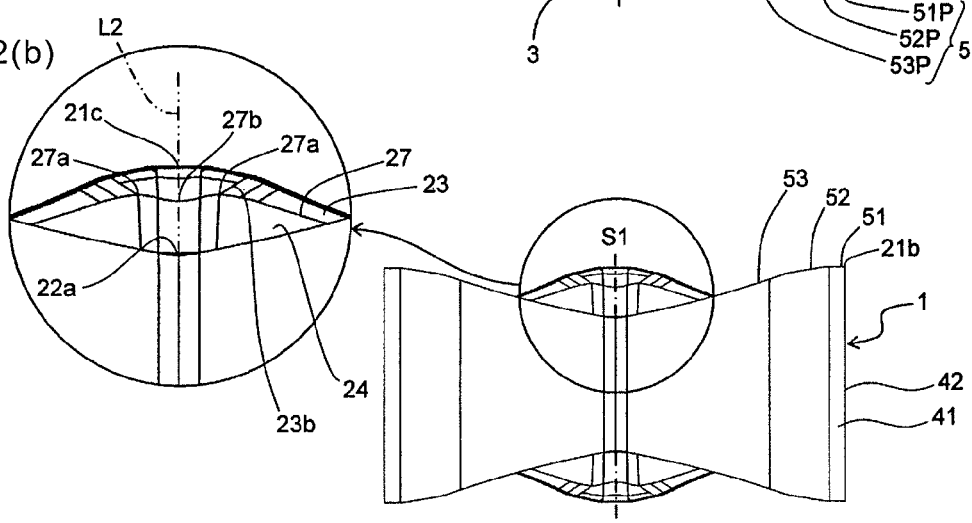
FIG. 2(b) is a fragmentary view taken in the direction of arrow X2.
Figure 2C:
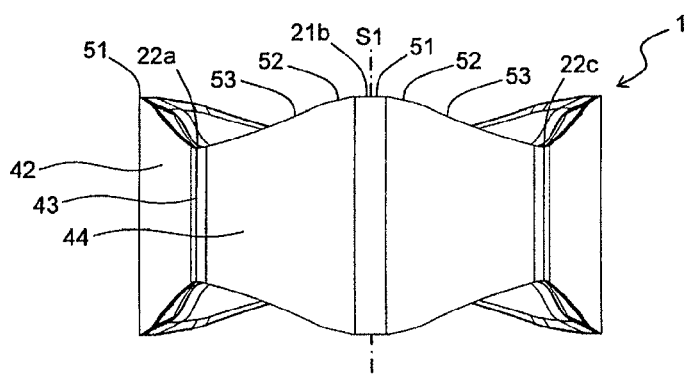
FIG. 2(c) is a fragmentary view taken in the direction of arrow X3.

As shown in FIGS. 1 and 2, the insert 1 of the present embodiment generally includes an upper surface 2 having a polygonal shape (hexagonal shape), a lower surface 3 being identical in shape to the upper surface 2, a side surface 4 connected to each of the upper surface 2 and the lower surface 3, a through hole 6 (fitting hole) extending between the upper surface 2 and the lower surface 3, an upper cutting edge 5 located at an intersecting part of the upper surface 2 and the side surface 4, and a lower cutting edge 5P located at an intersecting part of the lower surface 3 and the side surface 4. For example, the insert 1 may be configured so that the upper surface 2 measures 5-100 mm on each side and the upper and lower surfaces 2 and 3 respectively measure 3-100 mm thick. As shown in FIG. 1, the through hole 6 of the present embodiment is located at a middle part on each of the upper surface 2 and the lower surface 3.

The insert 1 of the present embodiment has the hexagonal shape (approximately hexagonal shape) as shown in FIG. 1(b) in the top view as described above. The term "top view" denotes a condition in which the insert 1 is viewed from the upper surface 2.

The insert 1 alternately includes three major corners 21 (first to third major corners 21a to 21c) as two or more major corners each having a first interior angle α1, and three minor corners 22 (first to third minor corners 22a to 22c) as two or more minor corners each having a second interior angle α2 larger than the first interior angle α1. The major corners 21 also respectively include a first corner described later. The minor corners also respectively include a second corner and a third corner described later. The first corner of the present embodiment corresponds to the first major corner 21a and hence is described by using the same reference numeral as the first major corner 21a. Similarly, the second corner of the present embodiment corresponds to the first minor corner 22a and hence is described by using the same reference numeral as the first minor corner 22a. The third corner of the present embodiment corresponds to the second minor corner 22b and hence is described by using the same reference numeral as the second minor corner 22b.

The concept of the term "hexagonal shape" includes somewhat deformation in such a range in which a certain function can be exhibited, without being limited to the case of a strict hexagonal shape (regular hexagon). That is, the hexagonal shape of the present embodiment includes, for example, the cases where individual sides or vertexes thereof are set to have a slightly curved line shape.

Further in the insert 1 of the present embodiment, the upper cutting edge 5 is located over the whole periphery of the upper surface 2, and includes first and second major cutting parts 5a and 5c (cutting sections) of identical shape which are extended from the single major corner 21 to each of the two minor corners 22 and 22 respectively adjacent to both sides of the single major corner 21 as shown in FIG. 1(b). Accordingly, a cutting process is performable by causing a bidirectional rotation for a right-handed operation and a left-handed operation at each of the three major corners 21. That is, the insert 1 of the present embodiment is usable as an insert substantially having the six major corners by using each of the three major corners 21 for the right-handed operation and the left-handed operation.

Here, the first interior angle α1 is preferably approximately right angles. The term "approximately right angles" denotes substantially right angles. Specifically, the approximately right angles in the present embodiment includes ones in the range of 90°±3°. In particular, the first interior angle α1 is preferably larger than 90°. The second interior angle α2 is preferably set in the range of 140° to 150°. The lengths of the individual sides are preferably identical from the viewpoint of ensuring a large length of the cutting edges contributing to cutting while using all of the individual sides for the cutting process.

The insert 1 of the present embodiment is the so-called negative type insert allowing both the upper surface 2 and the lower surface 3 to be respectively used as the surface that exhibits a rake function as shown in FIGS. 1(a) and 2(a). Accordingly, when the cutting process is performed with the lower cutting edge 5P, a part of the lower surface 3 is usable as a rake surface, and a part of the upper surface 2, namely, a later-described upper mount part 26 included in the upper surface 2 is usable as a seating surface (mount part). That is, according to the insert 1 of the present embodiment, the upper surface 2 and the lower surface 3 have the same shape, thus making both the upper and lower surfaces usable for the cutting process. When the cutting process is performed with the upper cutting edge 5, a part of the lower surface 3, namely, a planar lower mount part 36 included in the lower surface 3 functions as a seating surface (mount part) for ensuring attachment to a holder 11 (refer to FIG. 8). Unless otherwise stated, the description of the upper surface 2 is applicable to the lower surface 3.

Next, the individual components of the insert 1 of the present embodiment are described in details.

The upper surface 2 is the surface having a so-called rake function for discharging chips, and includes sequentially, as going inward from the upper cutting edge 5, a rake surface 23 inclined toward the lower surface 3, a connection surface 24 inclined toward the lower surface 3, and the planar upper mount part 26 approximately perpendicular to a central axis S1. The term "inward" denotes being located inside the insert 1 with respect to the upper cutting edge 5 and located close to the through hole 6 (the central axis S1). The term "central axis S1" is the axis that extends between the upper surface 2 and the lower surface 3, and serves as a rotation axis when the insert 1 is rotated in a top view.

In the present embodiment, the rake surface 23, the connection surface 24, and the upper mount part 26 are continuous with each other. This configuration ensures a larger area of the upper mount part 26, thereby improving attachment stability to the holder 11. That is, for example, a distance from a top portion 26t of the upper mount part 26 to a corner cutting edge 51, namely, an amount of overhang can be reduced so as to reduce a bending moment exerted on the insert 1. This configuration leads to suppression of damage to the insert 1 during the cutting process.

The rake surface 23 is the region mainly exhibiting the foregoing rake function and is continuous with the upper cutting edge 5. The rake surface 23 is inclined downward from the upper cutting edge 5 to the central axis S1, namely, inclined toward the lower surface 3 at a rake angle β on the basis of a perpendicular plane S1b perpendicular to the central axis S1 (refer to FIG. 4). In the present embodiment, the rake surface 23 is located over the whole periphery of the insert 1. The rake angle β is preferably set in the range of 10° to 30°.

Figure 3:
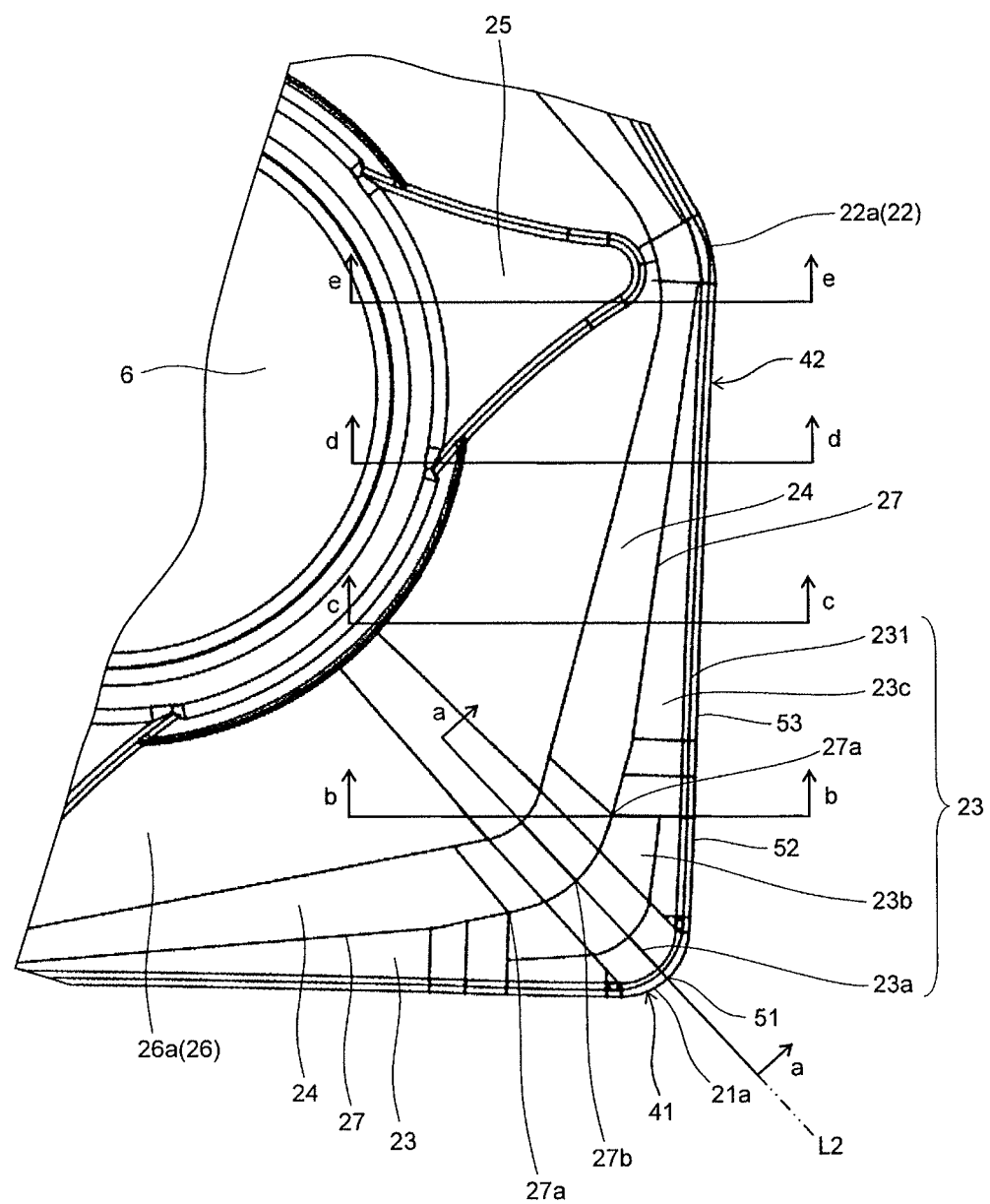
FIG. 3 is a partially enlarged plan view (top view) of the cutting insert shown in FIG. 1.

To be specific, the rake surface 23 includes a corner rake surface 23a, a minor rake surface 23b, and a major rake surface 23c as shown in FIG. 3. As shown in FIG. 4, the minor rake surface 23b is continuous with a later-described minor cutting edge 52 and is inclined downward as going inward, namely, inclined toward the lower surface 3 at a first rake angle β1 on the basis of the perpendicular plane S1b. The major rake surface 23c is continuous with a later-described major cutting edge 53 and is inclined downward as going inward, namely, inclined toward the lower surface 3 at a second rake angle β2 on the basis of the perpendicular plane S1b. The corner rake surface 23a is continuous with a later-described corner cutting edge 51 and is inclined downward as going inward, namely, inclined toward the lower surface 3 at a third rake angle β3 on the basis of the perpendicular plane S1b. In FIG. 3, the region between the minor rake surface 23b and the major rake surface 23c is a connection surface having a gentle curved surface shape.

In the present embodiment, as shown in FIGS. 2(b) and 4, an end portion of the rake surface 23 located inward, namely, an intersecting part 27 with the connection surface 24 includes a highest position in a portion 27a corresponding to the minor rake surface 23b. The term "highest position" denotes being large in terms of height on the basis of the upper mount part 26, namely, distance in the direction of the central axis S1 of the insert 1. More specifically, as shown in FIG. 4, a distance H between the perpendicular plane S1b passing through the intersecting part 27 and a perpendicular line L1 perpendicular to the central axis S1. The perpendicular line of the present embodiment passes through a midpoint in a thickness direction of the insert 1.

Under cutting conditions that the corner cutting edge 51 and the minor cutting edge 52 of the upper cutting edge 5 are used mainly and the depth of cut is relatively small, the foregoing configuration ensures that the generated chips can be curled stably by the high portion located on the minor rake surface 23b, thereby exhibiting the excellent chip discharge performance. More specifically, as shown in FIG. 1(b), the chips generated by the corner cutting edge 51 and the minor cutting edge 52 in the first major cutting part 5a pass from the relatively high minor rake surface 23b close to the first major cutting part 5a through the relatively low corner rake surface 23a to the relatively high minor rake surface 23b close to the second major cutting part 5b. This configuration allows the chips to be curled using a difference in height between the individual rake surfaces 23.

With the present embodiment, in the intersecting part 27 of the rake surface 23 and the connection surface 24, a portion 27b of the intersecting part 27 passing through a perpendicular bisector L2 of the first corner 21a is located at the lowest position in the region of the intersecting part 27 corresponding to the corner rake surface 23a. That is, the portion 27b passing through the perpendicular bisector L2 of the first corner 21a is disposed at the lowest position in the region of the intersecting part 27 corresponding to the corner rake surface 23a. The term "lowest position" denotes being small in terms of the height on the basis of the upper mount part 26, namely, the distance in the direction of the central axis S1 of the insert 1, more specifically, in terms of the foregoing distance H. In the present embodiment, the first to third major corners 21a to 21c have the same configuration. Therefore, the first corner 21a is described with reference to FIG. 2(b), taking the third major corner 21c as an example for the sake of convenience. With the foregoing configuration, a difference in height between the low portion 27b located on the corner rake surface 23a and the high portion 27a located on the minor rake surface 23b further facilitates curling of the chips, thereby further improving the chip discharge performance.

In the present embodiment, a third rake angle β3 of the corner rake surface 23a is larger than a first rake angle β1 of the minor rake surface 23b as shown in FIGS. 3 and 4. This configuration ensures reduction in the cutting resistance of the corner cutting edge 51, and also facilitates to set the minor rake surface 23b higher than the corner rake surface 23a. It is therefore ensured to exhibit the excellent chip discharge performance even under the cutting condition that the depth of cut is relatively small as described above. Further in the present embodiment, the third rake angle β3 of the corner rake surface 23a is set larger than a second rake angle β2 of the major rake surface 23c.

Figure 5:
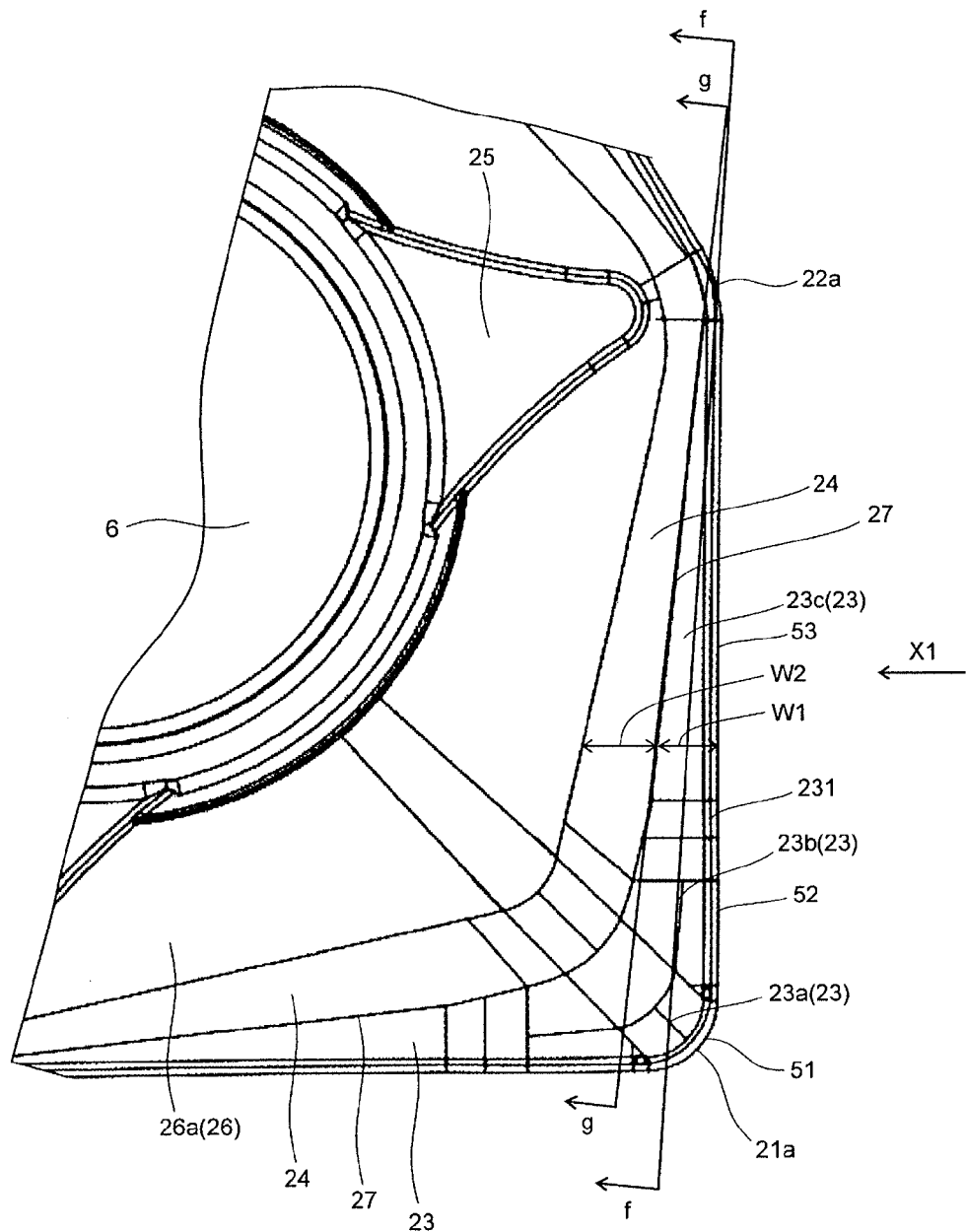
FIG. 5 is a plan view (top view) illustrating in enlarged dimension a part of the cutting insert shown in FIG. 1.
Figure 6A:
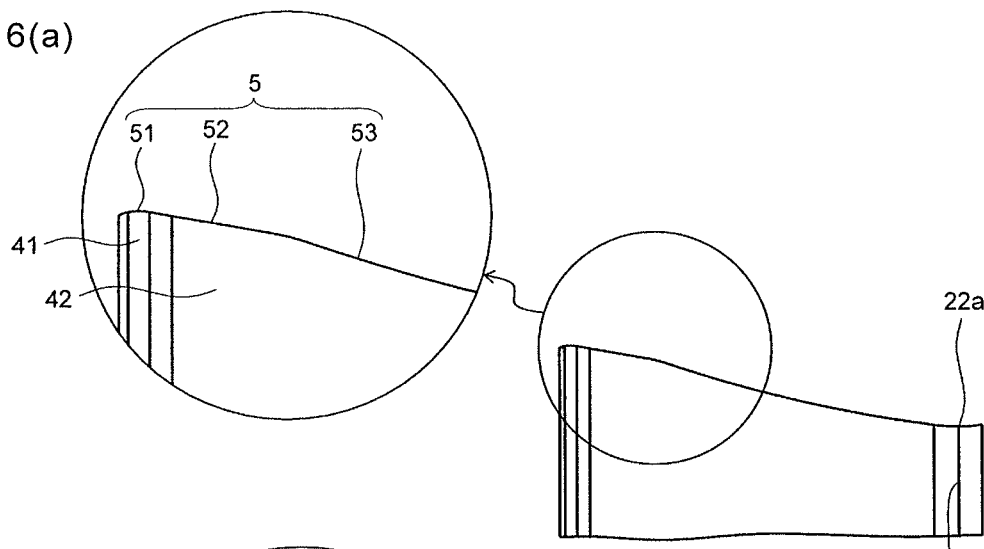
FIGS. 6(a) to 6(c) are views of the cutting insert of FIG. 5, taken from a first side surface, specifically.
Figure 6B:
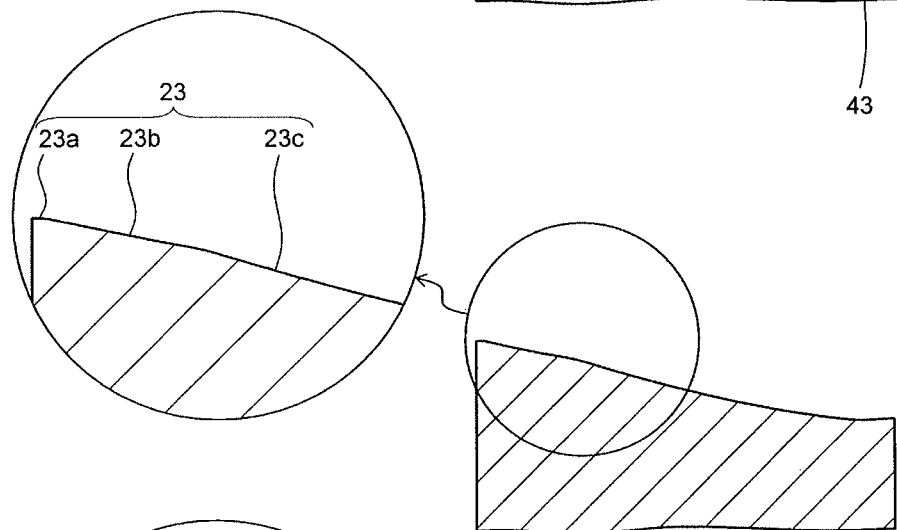

Also in the present embodiment, as shown in FIGS. 5 and 6, the shape of an inwardly located end portion of the rake surface 23, namely, a cross section obtained by cutting the intersecting part 27 of the rake surface 23 and the connection surface 24 along the direction of the central axis S1 is a straight line shape or concave shape in a region 23A crossing at least the minor rake surface 23b and the major rake surface 23c. The cross-sectional shape of the rake surface 23 of the present embodiment is formed into the straight line shape in the region 23A. This configuration ensures that convex-shaped chips generated by the portions of the minor cutting edge 52 and the major cutting edge 53 of the upper cutting edge 5 described later can be deformed in the straight line shape or concave shape in the process of passing through the rake surface 23. Therefore, the excellent chip discharge performance can be exhibited by stably curing the chips in the subsequent chip discharge process.

Figure 6C:
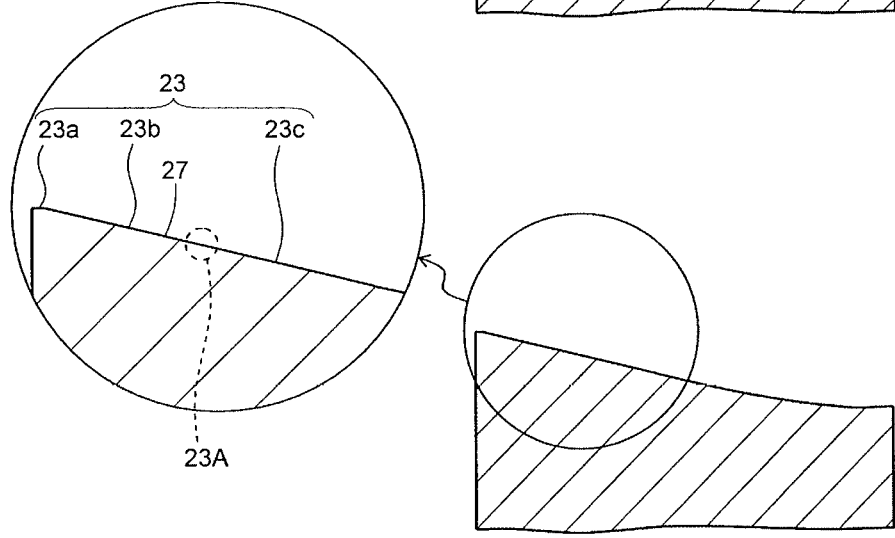

As shown in FIG. 6(c), the foregoing cross-sectional shape is preferably the straight line shape or concave shape in approximately the entire region of the minor rake surface 23b and the major rake surface 23c. This configuration ensures the excellent chip discharge performance under a wide range of cutting depth conditions. The end portion of the rake surface 23 located inward (the intersecting part 27) preferably has a straight line shape in a top view. This configuration further enhances the stability of chip curling.

As shown in FIG. 5, a width W1 of the rake surface 23 is preferably decreased from the first corner 21a to the second corner 22a in a top view. This configuration ensures the excellent chip discharge performance under the wide range of cutting depth conditions.

In the present embodiment, as shown in FIGS. 3 and 4, the rake surface 23 further includes a land surface 231 located at an end portion thereof and approximately parallel to the perpendicular plane S1b. With this configuration, the strength of the upper cutting edge 5 can be improved so as to be suitably used under machining conditions of so-called heavy-duty cutting.

The upper mount part 26 is the planar region located more inward than the rake surface 23 on the upper surface 2 as shown in FIG. 1, and the like. The upper mount part 26 has a wholly polygonal shape, particularly a hexagonal shape in a top view in the insert 1 of the present embodiment. The concept of the term "polygonal shape" includes, for example, the configuration that a connection part between the sides is somewhat curved in such a range in which a predetermined operation advantage can be obtained, without being limited to ones strictly having vertexes.

The outer periphery of the through hole 6 is located inside a region surrounded by a straight line L3 connecting top portions 26t corresponding to the three major corners 21 of the upper mount part 26 in a top view as shown in FIG. 1(b). The term "top portions" denotes the portions corresponding to the vertexes of the polygonal shape, however, it may denote regions in the vicinity of the vertexes which are respectively oval-shaped zones indicated by dotted lines as shown in FIG. 1(b). This is also true for the following.

The upper mount part 26 preferably includes three separate parts 26a connected to each other at the individual minor corners 22 as shown in FIG. 1(b). These three separate parts 26a respectively have a triangular shape in a top view. In particular, one of the vertices of the triangular shape of each of the separate parts 26a is preferably located closest to the major corner 21. This configuration ensures further improvement of the attachment stability to the holder 11. When the cutting process is performed with the upper cutting edge 5, the lower mount part 36 of the lower surface 3 serves as the surface brought into contact with the holder 11, and vice versa.

In the present embodiment, the upper mount part 26 of the upper surface 2 is located on the most underside, namely, located closest to the lower surface 3 among any portions of the upper cutting edge 5 in a side view as shown in FIG. 2. The term "side view" denotes a condition in which the insert 1 is viewed from the side surface 4. This configuration reduces the probability that the chips generated by the upper cutting edge 5 collide with the upper mount part 26 during the cutting process, thereby reducing damage to the upper mount part 26. Specifically, a large space for generating the chips can be ensured to improve the chip discharge performance by setting a large distance between the upper cutting edge 5 and the upper mount part 26. For example, if the shape of the upper mount part 26 is subjected to deformation, such as bending, during a firing process in the manufacturing process of the insert 1, it is difficult to shape the upper mount part 26 by polishing process when the upper mount part 26 is located closer to the lower surface 3 than the upper cutting edge 5. However, a stable contact with the contact surfaces of the holder 11 can be ensured by disposing a slope on the upper mount part 26, without requiring the polishing process.

One end portion of the lower mount part 36 of the lower surface 3, which is located closer to the central axis S1 than another end portion located closer to the lower cutting edge 5P, is located closer to the upper surface 2, namely, on the upper side on the basis of the perpendicular plane S1b. In other words, an outer peripheral region of the lower mount part 36 is located more outward than a middle region thereof on the lower surface 3 in the thickness direction of the insert 1. Accordingly, when the insert 1 is attached to the holder 11 with the upper surface 2 oriented forward in a rotation direction of the holder 11, the end portion of the lower mount part 36 located closer to the lower cutting edge 5P can be relatively strongly brought into contact with the corresponding contact surface of the holder 11, and the end portion thereof located closer to the central axis S1 can be relatively weakly brought into contact with the corresponding contact surface of the holder 11. Consequently, the attachment to the holder 11 via the end portion located closer to the lower cutting edge 5P can be assisted by the end portion located closer to the central axis S1, thereby improving the attachment stability to the holder 11. An inclination angle from the middle region to the outer peripheral region of the lower mount part 36 is preferably set in the range of 80° to 90° on the basis of the central axis S1.

As shown in FIGS. 1 to 5, the connection surface 24 is located between the rake surface 23 and the upper mount part 26, and is connected to each of the rake surface 23 and the upper mount part 26 on the upper surface 2. The connection surface 24 functions as a flank part for chips passing through the rake surface 23, and also contributes to ensuring the large area of the upper mount part 26.

As shown in FIG. 4, the connection surface 24 is inclined downward as going inward, namely, inclined toward the lower surface 3 at a connection angle γ on the basis of the perpendicular plane S1b. The connection angle γ of the connection surface 24 is larger than the rake angle β of the rake surface 23. That is, the connection angle γ of the connection surface 24 is larger than any one of the first rake angle β1 of the minor rake surface 23b, the second rake angle β2 of the major rake surface 23c, and the third rake angle β3 of the major rake surface 23c. This configuration ensures effective exhibition of the function as described above.

As shown in FIG. 5, a width W2 of the connection surface 24 is preferably decreased from the first corner 21a to the second corner 22a in a top view. This configuration ensures the excellent chip discharge performance under the wide range of cutting depth conditions.

Figure 4A:
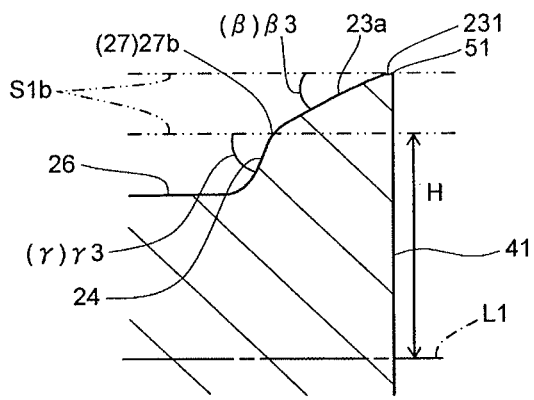
FIGS. 4(a) to 4(e) are cross-sectional views of the cutting insert shown in FIG. 1, illustrating a state that the cutting insert is cut along individual lines in FIG. 3, specifically.
Figure 4B:
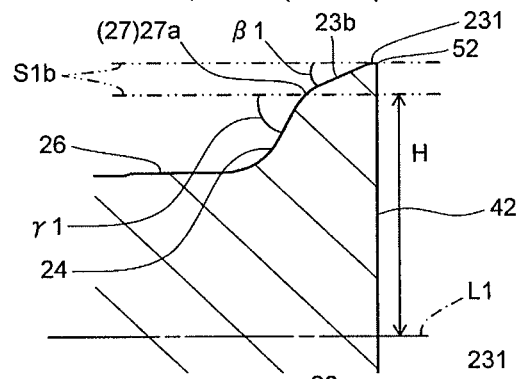
Figure 4C:
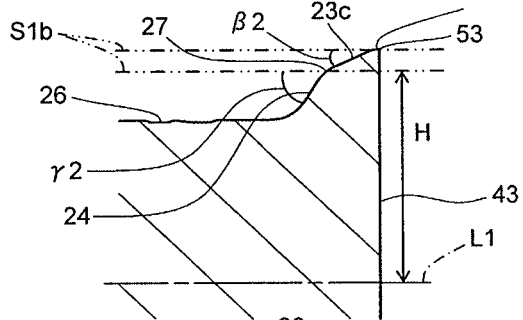
Figure 4D:
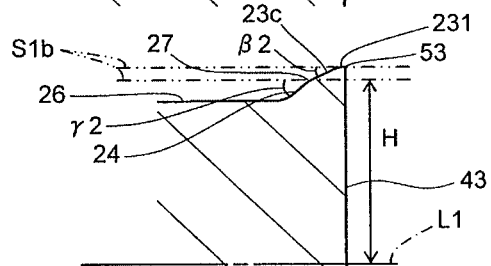
Figure 4E:
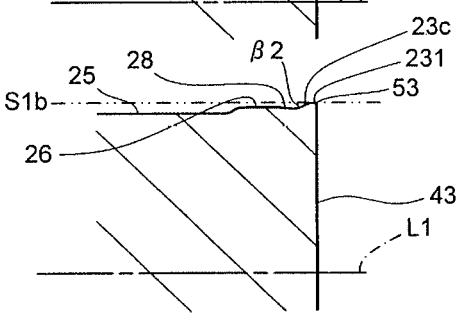

As shown in FIGS. 3 and 4(e), the connection surface 24 is not disposed over the whole periphery of the insert 1 in the present embodiment. Specifically, the connection surface 24 is not present in the vicinity of each of the minor corners 22. A protruded surface 28 inclined upward as going inward on the basis of the perpendicular plane S1b is disposed between the rake surface 23 and the upper mount part 26 in the vicinity of the minor corners 22. That is, the rake surface 23 is continuous with the upper mount part 26 with the protruded surface 28 interposed therebetween in the region of the rake surface 23 corresponding to the minor corner 22. With this configuration, at the time of chip discharge, the chips can be deformed into a small-diameter curled shape so as to improve the chip discharge performance. An inclination angle of the protruded surface 28 is preferably set in the range of 40° to 70° toward the upper surface 2 on the basis of the perpendicular plane S1b.

The upper surface 2 may further include a concave part 25 located closer to the lower surface 3, namely, more downwardly than the upper amount part 26 in an area surrounding the through hole 6 as shown in FIG. 1. Consequently, the foregoing three separate parts 26a are spaced apart from one another with the through hole 6 and the concave part 25 interposed therebetween. This configuration allows each of the three separate parts 26a to be more surely brought into contact with the corresponding contact surface of the holder 11, thereby further improving the attachment stability to the holder 11.

The upper cutting edge 5 includes the corner cutting edge 51, the minor cutting edge 52, and the major cutting edge 53 as shown in FIGS. 1 and 2. Specifically, the upper cutting edge 5 of the present embodiment includes the corner cutting edge 51, the minor cutting edge 52 inclined downward as spaced apart from the corner cutting edge 5, namely, inclined at a first inclination angle θ1 on the basis of the perpendicular plane S1b, and the major cutting edge 53 inclined downward as spaced apart from the minor cutting edge 52, namely, at a second inclination angle θ2 on the basis of the perpendicular plane S1b so as to further approach the lower surface 3 than the minor cutting edge 52. The corner cutting edge 51, the minor cutting edge 52, and the major cutting edge 53 are located sequentially, for example, from the first major corner (first corner) 21a of the three major corners 21 to the first minor corner (second corner) 22a of the three minor corners 22 which is adjacent to the first major corner 21a. Consequently, the chips generated by the portions of the minor cutting edge 52 and the major cutting edge 53 of the upper cutting edge 5 are formed into the convex shape as described above.

The insert 1 is capable of having both low cutting resistance and excellent fracture resistance by combining the inclination configuration of the individual cutting edge regions of the upper cutting edge 5 with the major corners 21 having the first interior angle α1 and the minor corners 22 having the second interior angle α2. The upper cutting edge 5 also includes the corner cutting edge 51, the minor cutting edge 52, and the major cutting edge 53, which are disposed sequentially from the first major corner (first corner) 21a to another adjacent second minor corner 22b of the three minor corners 22. That is, the insert 1 of the present embodiment is configured to be usable for the right-handed and left-handed operations as described above.

The corner cutting edge 51 is located at an intersecting part of a later-described major corner side surface 41 of the side surface 4 and the upper surface 2 as shown in FIG. 2, and functions to suppress fracture of the upper cutting edge 5 due to cutting force applied thereto during the cutting process. The corner cutting edge 51 is parallel to the perpendicular plane S1b in the present embodiment.

The corner cutting edge 51 preferably has a straight line shape in a top view in the present embodiment. This configuration increases the width of the front end of the cutting edge in the top view in comparison with a rounded corner, thereby ensuring high cutting edge strength. Consequently, the thickness of chips generated by the major corner 21 can be decreased, thus making it possible to effectively suppress fracture, so-called edge chipping, of edge portions of a workpiece even during machining of cast iron that is a relatively brittle workpiece. The corner cutting edge 51 is preferably inclined at approximately 45° on the basis of a part of the upper cutting edge 5 adjacent thereto (for example, the minor cutting edge 52). This configuration allows the insert 1 to be usable for both the right-handed and left-handed operations.

As shown in FIG. 2, the minor cutting edge 52 is located close to the corner cutting edge 51 in an intersecting part of a later-described first side surface 42 of the side surface 4 and the upper surface 2. As shown in FIG. 1(b), the minor cutting edge 52 functions as first and second major cutting sections 5a and 5c together with the major cutting edge 53. The minor cutting edge 52 is also the cutting edge, so-called flat drag, functioning mainly to improve the accuracy of a later-described finished surface 102 of a workpiece 100. In the present embodiment, the minor cutting edge 52 has a straight line shape both in a top view and a side view as shown in FIGS. 2 and 3.

As shown in FIG. 2(a), the minor cutting edge 52 is preferably inclined downward as going away from the corner cutting edge 51, namely, inclined toward the lower surface 3 at a first inclination angle θ1 on the basis of the perpendicular plane S1b. This configuration ensures reduction in the cutting resistance of the minor cutting edge 52 during the cutting process. Alternatively, the first inclination angle θ1 of the minor cutting edge 52 may be inclined upward, namely, in a direction to go away from the lower surface 3 on the basis of the perpendicular plane S1b.

The first inclination angle θ1 of the minor cutting edge 52 is preferably set in the range of 3° to 15° toward the lower surface 3. In the present embodiment, the term "first inclination angle θ1" denotes an angle formed by the perpendicular plane S1b and a virtual extension line L4 of the minor cutting edge 52. The term "virtual extension line L4" denotes a straight line obtained by extending a tangential line at a start point of the minor cutting edge 52, namely, the end portion of the minor cutting edge 52 located close to the corner cutting edge 51.

The major cutting edge 53 is located closer to the first minor corner 22a than the minor cutting edge 52 in the intersecting part of the first side surface 42 and the upper surface 2 as shown in FIG. 2. The major cutting edge 53 functions mainly to generate chips during the cutting process.

The second inclination angle θ2 of the major cutting edge 53 is preferably set in the range of 7° to 19° toward the lower surface 3. In the present embodiment, the term "second inclination angle θ2" denotes an angle formed by the perpendicular plane S1b and a virtual extension line L5 of the major cutting edge 53. The term "virtual extension line L5" denotes a straight line obtained by extending a tangential line at a start point of the major cutting edge 53, namely, the end portion of the major cutting edge 53 located close to the minor cutting edge 52.

In the present embodiment, the major cutting edge 53 has a concave shape recessed toward the lower surface 3 in a side view. That is, the major cutting edge 53 is curved toward the lower surface 3 in the side view as shown in FIGS. 2 (a) and 6(a).

As shown in FIG. 2(a), the first inclination angle θ1 of the minor cutting edge 52 is preferably smaller than the second inclination angle θ2 of the major cutting edge 53. This configuration ensures both high cutting strength on the minor cutting edge 52 and low cutting resistance on the major cutting edge 53.

A connection part 54 of the major cutting edge 53 and the minor cutting edge 52 is preferably set to have a convex shape in a side view, namely, so as to be curved in the range of R1.0 to R10.0 in a direction to go away from the lower surface 3 (i.e. upwardly).

Although the thickness of the insert 1 of the present embodiment is decreased from the major corner (first corner) 21a to the first minor corner (second corner) 22a as shown in FIG. 2(a), the second interior angle α2 of the second corner 22a is larger than the first interior angle α1 of the first corner 21a as shown in FIG. 1(b), thereby ensuring high cutting edge strength in each of cutting edge regions of the upper cutting edge 5.

Similarly to the upper cutting edge 5, the lower cutting edge 5P also includes a corner cutting edge 51P, a minor cutting edge 52P, and a major cutting edge 53P as shown in FIG. 2(a). The configurations of the corner cutting edge 51P, the minor cutting edge 52P, and the major cutting edge 53P are respectively identical to those of the corner cutting edge 51, the minor cutting edge 52, and the major cutting edge 53.

The side surface 4 is the surface functioning as a so-called clearance part for reducing contact with the workpiece 100. In the present embodiment, as shown in FIG. 2, the side surface 4 is perpendicular to the upper surface 2 and the lower surface 3, namely, perpendicular on the basis of the central axis S1. This configuration ensures the thickness of the insert 1 in a direction perpendicular to the central axis S1, and hence the insert 1 has excellent fracture resistance in comparison with an insert whose side surface 4 has a clearance angle between the upper surface 2 or the lower surface 3.

As a specific configuration, the side surface 4 connected to the hexagonal shaped upper surface 2 sequentially has, in a direction from the first major corner 21a to the second major corner 21b, a major corner side surface 41, a first side surface 42, a minor corner side surface 43, and a second side surface 44 as shown in FIG. 2(a). Both the first side surface 42 and the second side surface 44 are planar surfaces. The minor corner side surface 43 is a curved surface, and the major corner side surface 41 is a planar surface. This configuration corresponds to the fact that the corner cutting edge 51 located at the intersecting part of the major corner side surface 41 and the upper surface 2 has a straight line shape in the top view.

The through hole 6 extends between the upper surface 2 and the lower surface 3 as shown in FIG. 1, and the like, and functions to fix the insert 1 to the later-described holder 11. That is, a fitting screw 12 (fixing member) is inserted into the through hole 6 and is further screwed to the holder 11. The insert 1 is thus fixed to the holder 11 so as to obtain a cutting tool 10. The central axis of the through hole 6 exists at the same position as the central axis S1.

<Cutting Tool>

Figure 7A:
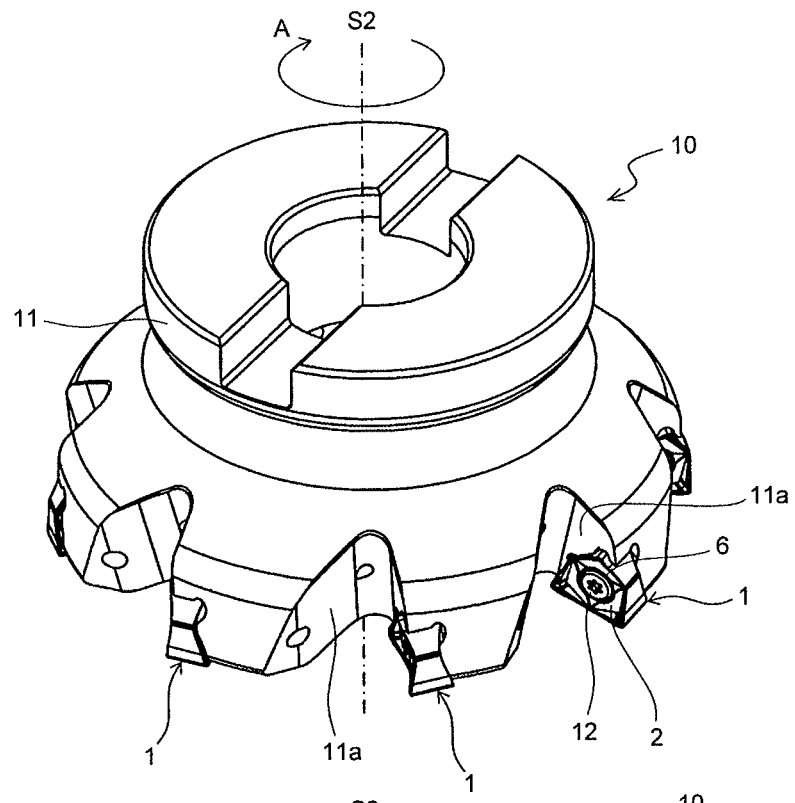
FIG. 7(a) is a perspective view of a cutting tool according to an embodiment of the present invention.

A cutting tool according to an embodiment of the present invention is described in details below with reference to FIGS. 7 and 8.

Figure 7B:
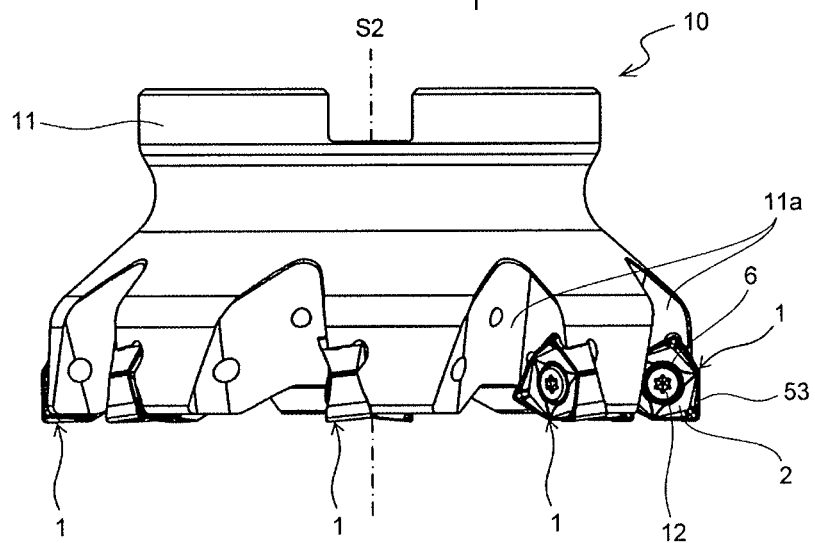
FIG. 7(b) is a side view thereof.

As shown in FIG. 7, the cutting tool 10 of the present embodiment includes a plurality of inserts 1 according to the foregoing embodiment, and the holder 11 configured to attach the plurality of inserts 1 thereto by using a fixing member.

The holder 11 has a plurality of insert pockets 11a at outer peripheral front ends thereof. The inserts 1 are respectively attached to outer peripheral positions in the insert pockets 11a. Specifically, when the cutting tool 10 is rotated in an arrowed direction A in FIG. 7(a), the inserts 1 are attached so that the upper surface (rake surface) 2 is oriented forward in the arrowed direction A as the rotation direction, and the major cutting edge 53 is located at the outermost periphery of the holder 11. As an attachment method, the plurality of inserts 1 are respectively fixed to the holder 11 by inserting the fitting screw 12 (fixing member) into each of the through holes 6 of the plurality of inserts 1, and by screwing the fitting screw 12 to the holder 11.

Figure 8A:
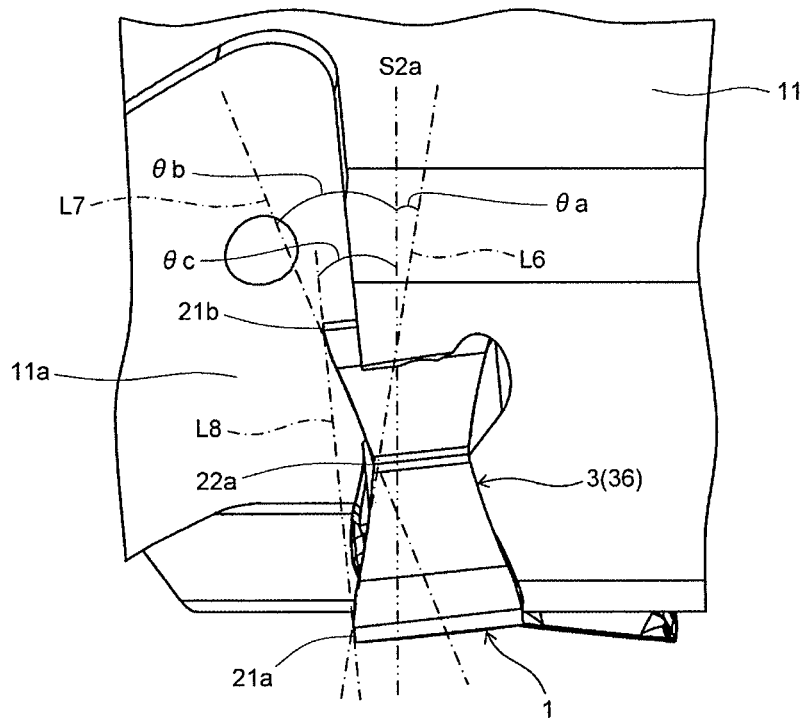
FIGS. 8(a) and 8(b) are respectively side views illustrating in enlarged dimension an attached state of the cutting insert in the cutting tool of FIG. 7, specifically.

In the present embodiment, as shown in FIG. 8(a), each of the inserts 1 is attached to the holder 11 in a state that the first major cutting section 5a of the upper cutting edge 5 extending from the first major corner (first corner) 21a to the first minor corner (second corner) 22a adjacent thereto has a positive axial rake angle $\theta a$, and that the non-cutting section 5b of the upper cutting edge 5 extending from the first minor corner 22a to the second major corner 21b adjacent thereto has a negative axial rake angle $\theta b$ on the basis of a parallel plane S2a parallel to a rotation axis S2 of the holder 11.

The first major cutting section 5a includes the minor cutting edge 52 and the major cutting edge 53, and has a positive axial rake angle $\theta a$ both in the minor cutting edge 52 and the major cutting edge 53 in the present embodiment. For example, the axial rake angle of the minor cutting edge 52 is preferably set in the range of 0° to 10°, and the axial rake angle of the major cutting edge 53 is preferably set in the range of 5° to 20°. With respect to a curved line shaped cutting edge, such as the major cutting edge 53, the axial rake angle $\theta a$ may be measured using a straight line L6 obtained by extending a tangential line at a start point of the major cutting edge 53, namely, the end portion thereof located close to the minor cutting edge 52. The axial rake angle $\theta b$ may be measured using a straight line L7 obtained by extending a tangential line at a start point of the non-cutting section 5b, namely, the end portion thereof located close to the first minor corner 22a.

As shown in FIG. 8(a), each of the inserts 1 is also attached to the holder 11 in a state that a straight line L8 connecting the first major corner 21a and the second major corner 21b of the upper cutting edge 5 has a negative axial rake angle $\theta c$. In other words, the entirety including the first major cutting section 5a and the non-cutting section 5b has a negative axial rake angle.

The cutting tool 10 is obtained by attaching the inserts 1 to the holder 11 in the above manner. The workpiece 100 can be subjected to various kinds of cutting processes, such as the face milling process and a plunge milling process, as described later, by rotating the cutting tool 10 in the arrowed direction A.

Figure 8B:
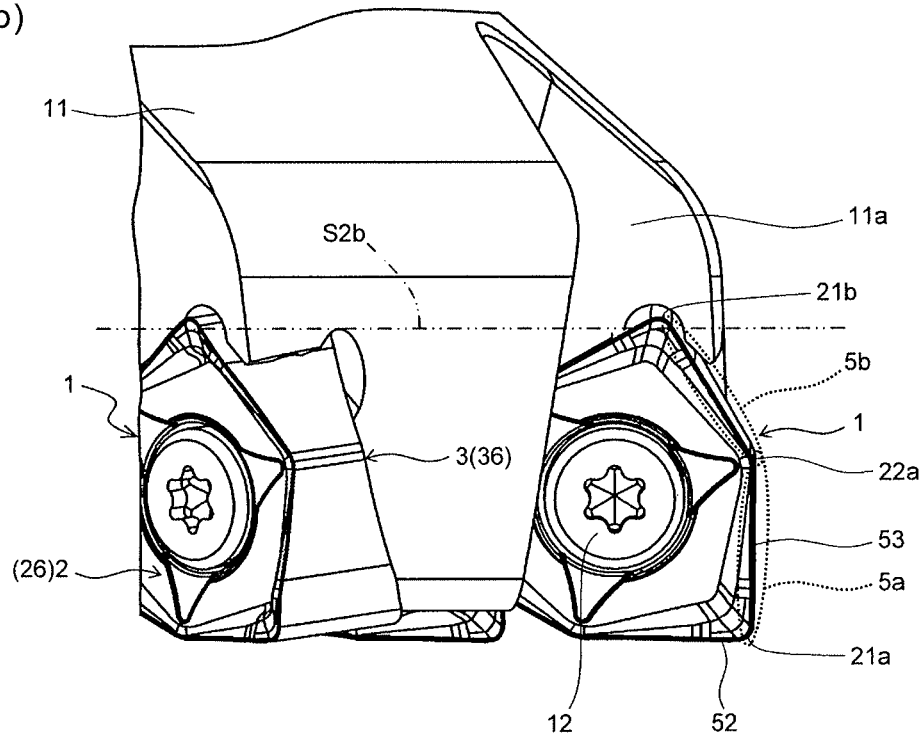

For example, when the face milling process is performed as shown in FIG. 8(b), a cut surface 101 can be formed by cutting the workpiece 100 with the first major cutting section 5a of the insert 1, and the finished surface 102 can be formed by cutting the workpiece 100 with the minor cutting edge 52. Here, a setting is made so that the minor cutting edge 52 has an approximately parallel relationship with the perpendicular plane S2b perpendicular to the rotation axis S2 of the holder 11.

<Method of producing Machined Product>

Next, methods of producing a machined product according to a first or second embodiment of the present invention are described in details below with reference to FIGS. 9 and 10.

The method of producing a machined product according to the first or second embodiment includes rotating the cutting tool 10 of the foregoing embodiment on the basis of the rotation axis S2 of the holder 11, bringing the upper cutting edge 5 of the cutting tool 10 being rotated into contact with a surface of the workpiece 100, and separating the cutting tool 10 from the workpiece 100. The first and second embodiments are respectively described in details below.

First Embodiment

The method of producing a machined product according to the first embodiment is described in details with reference to FIG. 9 by taking the so-called face milling process as an example.

The method of producing a machined product according to the present embodiment includes the following steps (i) to (iii). In the following, the order of these steps may be changed suitably unless otherwise stated.

Figure 9A:
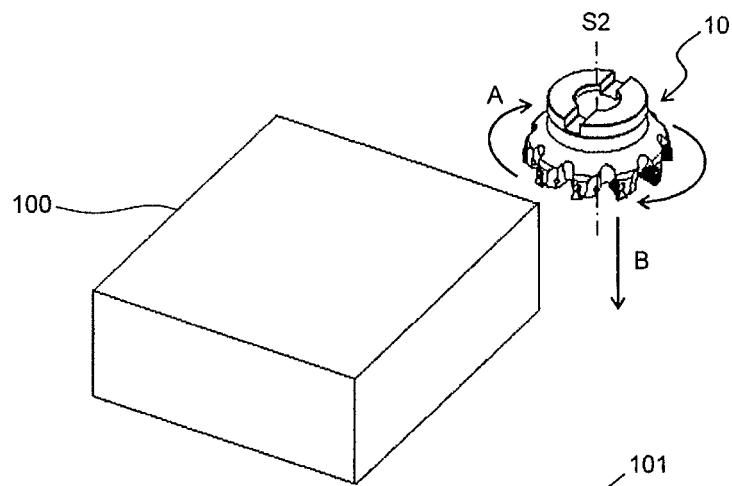
FIGS. 9(a) to 9(c) are process drawings showing a method of producing a machined product according to a first embodiment of the present invention.

The step (i) includes rotating the cutting tool 10 around the rotation axis S2 of the holder 11 (cutting tool 10) in the arrowed direction A as shown in FIG. 9(a), and moving the cutting tool 10 in an arrowed direction B so as to bring the cutting tool 10 near the workpiece 100.

Figure 9B:
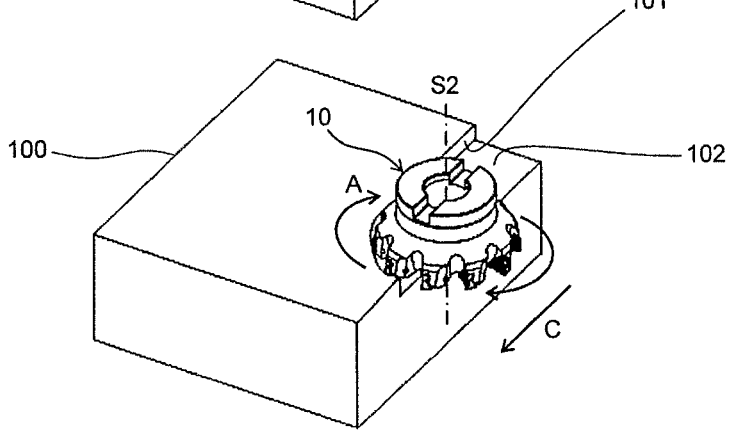

The step (ii) is to bring the upper cutting edge 5 of the cutting tool 10 being rotated into contact with the surface of the workpiece 100 as shown in FIG. 9(b). In the present embodiment, the step (ii) includes the following three substeps.

The first substep is to allow the cutting tool 10 being rotated to move in an arrowed direction C that is the direction perpendicular to the rotation axis S2. Thereby, the workpiece 100 can be subjected to the face milling process.

The second substep is to bring the first major cutting section 5a of the upper cutting edge 5 extending from the first major corner 21a to the first minor corner 22a adjacent thereto in the cutting tool 10 being rotated, into contact with the surface of the workpiece 100. Consequently, a target cutting surface of the workpiece 100 cut by being brought into contact with the first major cutting section 5a becomes the cut surface 101 as shown in FIG. 9(b).

The third substep is to bring the minor cutting edge 52 of the upper cutting edge 5 located between the first major corner 21a and the second minor corner 22b in the cutting tool 10 being rotated, into contact with the target cutting surface of the workpiece 100 formed by being brought into contact with the first major cutting section 5a. Thereby, the portion of the target cutting surface of the workpiece 100 cut by the first major cutting section 5a in the foregoing second substep, which remains without being directly cut by the first major cutting section 5a, can be smoothed by the minor cutting edge 52, resulting in the finished surface 102 as shown in FIG. 9(b).

Figure 9C:
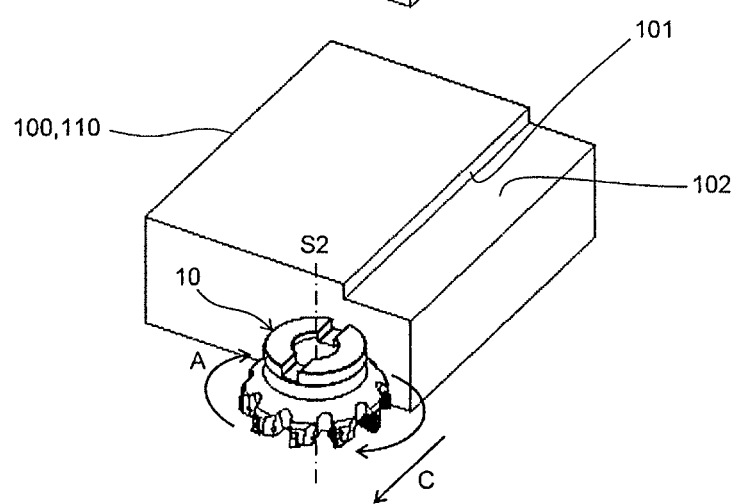

The step (iii) is to move the cutting tool 10 just as it is in an arrowed direction C as shown in FIG. 9(c) so as to separate the cutting tool 10 from the workpiece 100.

Thus, the workpiece 100 is subjected to the foregoing individual steps so as to be cut into the desired shape as shown in FIG. 9(c), thereby producing a machined product 110.

When the cutting process is continuously performed, for example, it is required to repeat the step of bringing the upper cutting edge 5 of the cutting tool 10 into contact with different portions of the workpiece 100, while keeping the rotation of the cutting tool 10.

When the major corner 21 of the upper cutting edge 5 used for the cutting process is worn, the major corner 21 of the upper cutting edge 5 not yet being used can be used by rotating the insert 1 by 120° with respect to the central axis S1. Alternatively, in the present embodiment, the single major corner 21 of the insert 1 is usable for a reverse-handed cutting process by rotating the cutting tool 10 in the opposite direction to the arrowed direction A. Thus, the present embodiment permits use as the insert substantially having the six major corners by using each of the three major corners 21 for both the right-handed and left-handed operations. By changing the rotation direction of the cutting tool 10 into the opposite direction to the arrowed direction A, the minor cutting edge 52 in the first major cutting section 5a functions as a cutting edge for forming the finished surface 102. The above description of the upper cutting edge 5 is also true for the lower cutting edge 5P.

The following modifications are applicable to the foregoing steps. For example, in the step (i), the workpiece 100 may be rotated while keeping the cutting tool 10 stationary. The cutting tool 10 and the workpiece 100 need to be closer to each other. For example, conversely to the above-mentioned step, the workpiece 100 may be brought near the cutting tool 10. Similarly, in the step (iii), the workpiece 100 and the cutting tool 10 need to be separated from each other. For example, the workpiece 100 may be separated from the cutting tool 10 being held at a predetermined position. These modifications are also applicable to the following second embodiment.

Second Embodiment

The method of producing a machined product according to the second embodiment is described in details with reference to FIG. 10 by taking so-called plunge milling process as an example.

The method of producing a machined product according to the present embodiment includes the following steps (i) to (iii). In the following, the order of these steps may be changed suitably unless otherwise stated.

Figure 10A:
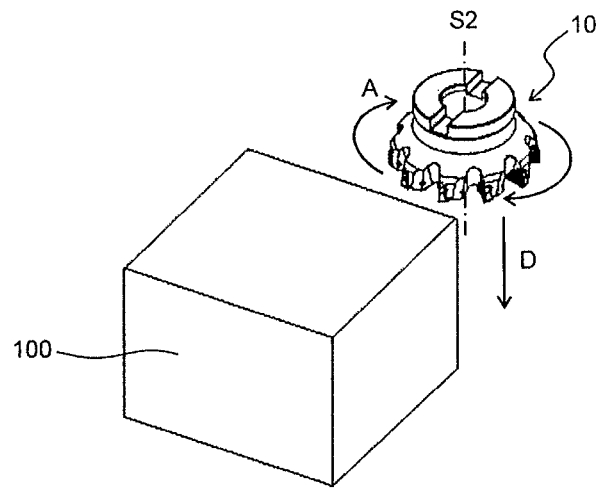
FIGS. 10(a) to 10(c) are process drawings showing a method of producing a machined product according to a second embodiment of the present invention.

The step (i) includes rotating the cutting tool 10 around the rotation axis S2 of the holder 11 (cutting tool 10) in an arrowed direction A as shown in FIG. 10(a), and moving the cutting tool 10 in an arrowed direction D so as to bring the cutting tool 10 near the workpiece 100.

Figure 10B:
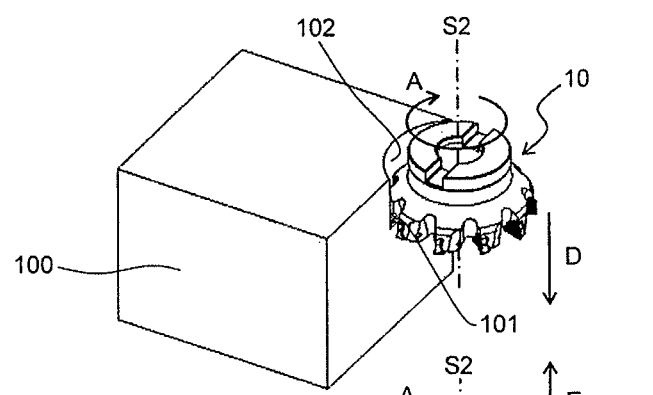

The step (ii) is to bring the upper cutting edge 5 of the cutting tool 10 being rotated into contact with a surface of the workpiece 100 as shown in FIG. 10(b). In the present embodiment, the step (ii) includes the following three substeps.

The first substep is to allow the cutting tool 10 being rotated to move in an arrowed direction D that is the direction parallel to the rotation axis S2. Thereby, the workpiece 100 can be subjected to the plunge milling process.

The second substep is to bring the second major cutting section 5c of the upper cutting edge 5 extending from the first major corner 21a to the second minor corner 22b adjacent thereto in the cutting tool 10 being rotated, into contact with the surface of the workpiece 100. Consequently, a target cutting surface of the workpiece 100 cut by being brought into contact with the second major cutting section 5c becomes a cut surface 101 as shown in FIG. 10(b).

The third substep is to bring the minor cutting edge 52 of the upper cutting edge 5 located between the first major corner 21a and the first minor corner 22a in the cutting tool 10 being rotated, into contact with the target cutting surface of the workpiece 100 formed by being brought into contact with the second major cutting section 5c. Thereby, the portion of the target cutting surface of the workpiece 100 cut by the second major cutting section 5c in the foregoing second substep, which remains without being directly cut by the second major cutting section 5c, can be smoothed by the minor cutting edge 52, resulting in a finished surface 102 as shown in FIG. 10(b).

Figure 10C:
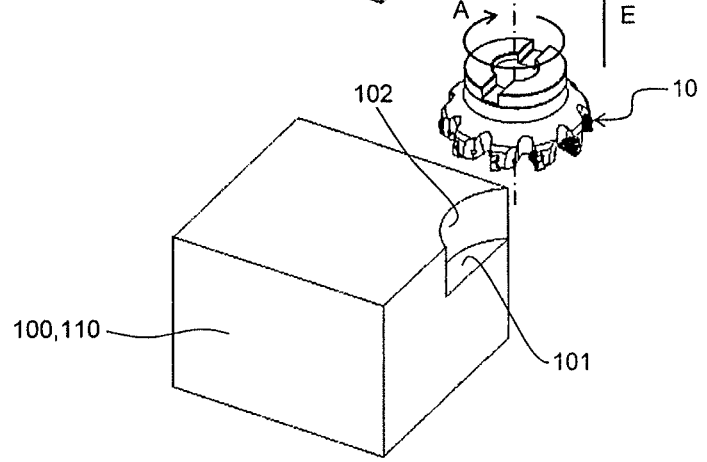

The step (iii) is to move the cutting tool 10 in an arrowed direction E as shown in FIG. 10(c) so as to separate the cutting tool 10 from the workpiece 100.

Thus, the workpiece 100 is subjected to the foregoing individual steps so as to be cut into the desired shape as shown in FIG. 10(c), thereby producing a machined product 110.

When the cutting process is continuously performed, it is required to perform similarly to the foregoing first embodiment. Also, when the cutting edge used for the cutting process is worn, it is required to perform similarly to the foregoing first embodiment.

While the several embodiments of the present invention have been illustrated and described, it is to be understood that the present invention is not limited to the foregoing embodiments but various changes and modifications can be made therein without departing from the spirit or scope of the present invention.

For example, the inserts 1 of the foregoing embodiments have the hexagonal shape (approximately hexagonal shape) in the top view as shown in FIG. 1(b). Alternatively, the present invention is applicable to different polygonal shapes, such as quadrangular shape and pentagonal shape. Even in such cases, the foregoing operation advantages are achievable by having the foregoing configurations.

In the foregoing embodiments, the upper surface 2 and the lower surface 3 of the inserts 1 are identical in shape. Alternatively, the upper surface 2 and the lower surface 3 may have different shapes. For example, a configuration that ensures a large clearance angle of the side surface 4 corresponding to the upper cutting edge 5 may be employed to obtain a so-called one side insert for use in the cutting process with the upper cutting edge 5 of the upper surface 2. This configuration is achievable by, for example, making the area of the lower surface 3 smaller than the area of the upper surface 2.

In the insert 1 according to the foregoing embodiment, the description has been made of the upper mount part 26 having the three separate parts 26*a* connected to one another. This configuration may be replaced by a configuration that these three separate parts 26*a* are spaced apart from one another as long as a similar effect is obtainable. Accordingly, when each insert 1 is attached to the holder 11, these three separate parts 26*a* of the insert 1 can be individually brought into contact with the corresponding contact surfaces of the holder 11, thus ensuring improvement in the attachment stability to the holder 11. For example, even when the upper mount part 26 is subjected to deformation, such as curvature, these three separate parts 26*a* can be relatively strongly brought into contact with the contact surfaces of the holder 1 without requiring any additional process, such as the polishing process, because these three separate parts 26*a* are independent of one another.

Instead of the configuration of the foregoing embodiment, a setting may be made so that the first rake angle β1 of the minor rake surface 23*b* is larger at the end portion of the minor rake surface 23*b* close to the second corner 22*a* than the end portion thereof close to the first corner 21*a*, and so that the second rake angle β2 of the major rake surface 23*c* is larger at the end portion of the major rake surface 23*c* close to the first corner 21*a* than the end portion thereof close to the second corner 22*a*. With this configuration, the insert 1 of this embodiment also ensures that the convex-shaped chips generated by the portions of the minor cutting edge 52 and the major cutting edge 53 of the upper cutting edge 5 can be deformed in the straight line shape or concave shape in the process of passing through the rake surface 23. Therefore, the excellent chip discharge performance can be exhibited by stably curing the chips in the subsequent chip discharge process. In this case, it is preferable to make a setting so that the second rake angle β2 of the major rake surface 23*c* is increased from the second corner 22*a* to the first corner 21*a*. Thus, the first rake angle β1 and the second rake angle β2 are increased toward the connection part (boundary part) of the minor rake surface 23*b* and the major rake surface 23*c*, thereby ensuring smoother chip discharge.

Figure 11:
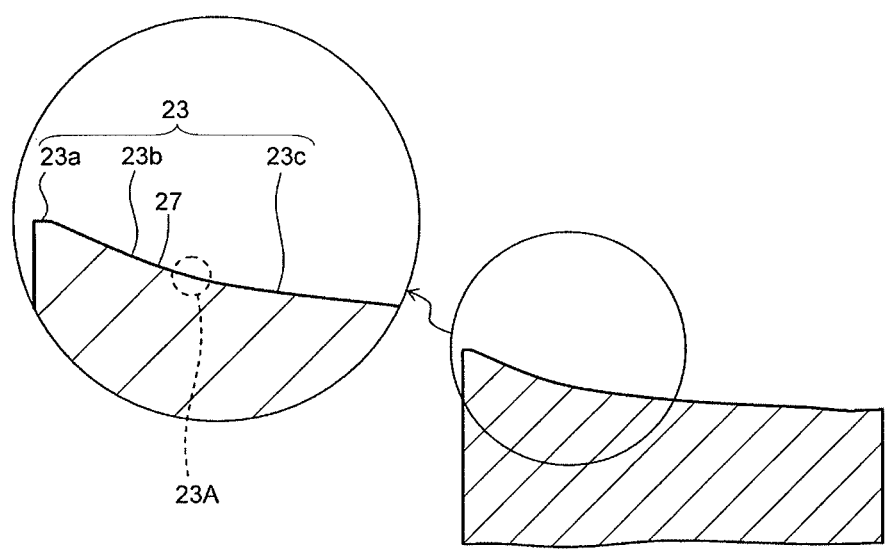
FIG. 11 is a view showing a modification of a rake surface in the cutting insert of FIG. 1, specifically a sectional view corresponding to FIG. 6(c).

In the insert 1 according to the foregoing embodiment, the foregoing cross-sectional shape of the rake surface 23 is formed into the straight light shape in the region 23A. Alternatively, the foregoing cross-sectional shape may be formed into a concave shape in the region 23A (refer to FIG. 11).

Although not being particularly described in the inserts 1 of the foregoing embodiment, the upper surface 2 and the lower surface 3 may have different colors. Specifically, for example, when an insert body is made of silver-colored cemented carbide, either the upper surface 2 or the lower surface 3 is preferably coated with gold-colored titanium nitride (TiN). In the negative-type insert, both the upper surface 2 and the lower surface 3 function as the rake surface, and hence an erroneous attachment of the inserts might occur. By coating either the upper surface 2 or the lower surface 3 with TiN, a surface coated with TiN and an uncoated surface have different colors. It is therefore possible to clearly distinguish between these two surfaces, thereby reducing misrecognition when attaching the inserts 1. Here, a target coating surface of either the upper surface 2 or the lower surface 3 need not be entirely coated. A similar effect is obtainable by coating, for example, a part of the target coating surface (e.g., a portion other than the cutting edges) with TiN. The material used for the coating is not limited to TiN as long as one can recognize a color difference between the upper surface 2 and the lower surface 3. For example, when the insert body is made of cemented carbide, it is also possible to employ bright reddish brown colored titanium carbonitride (TiCN), dark reddish brown colored titanium aluminum nitride (TiAlN), or the like.

The invention claimed is:

1. A cutting insert, comprising:
a polygonal shaped upper surface;
a lower surface being identical in shape to the upper surface;
a side surface connected to each of the upper surface and the lower surface; and
an upper cutting edge located at an intersecting part of the upper surface and the side surface,
wherein the upper surface comprises a first corner, and a second corner and a third corner respectively adjacent to both sides of the first corner,
wherein the upper surface sequentially comprises
a rake surface located along the upper cutting edge and inclined toward the lower surface as going inward from the upper cutting edge at a rake angle on a basis of a perpendicular plane perpendicular to a central axis extending between the upper surface and the lower surface, and
a connection surface located more inward than the rake surface and inclined toward the lower surface as going inward at a connection angle on the basis of the perpendicular plane,
wherein the upper cutting edge sequentially comprises a corner cutting edge, and a minor cutting edge and a major cutting edge each being inclined toward the lower surface on the basis of the perpendicular plane as going away from the corner cutting edge, and the corner cutting edge and the minor cutting edge and the major cutting edge are disposed in a direction from the first corner to each of the second corner and the third corner,
wherein the rake surface comprises
a minor rake surface located inwardly of the minor cutting edge and inclined toward the lower surface as going inward at a first rake angle on the basis of the perpendicular plane,
a major rake surface located inwardly of the major cutting edge and inclined toward the lower surface as going inward at a second rake angle on the basis of the perpendicular plane, and
a corner rake surface located inwardly of the corner cutting edge and inclined toward the lower surface as going inward at a third rake angle on the basis of the perpendicular plane, and
wherein an intersecting part of the rake surface and the connection surface comprises a highest position in a portion of the intersecting part corresponding to the minor rake surface.

2. The cutting insert according to claim 1, wherein the intersecting part of the rake surface and the connection surface comprises a region corresponding to the corner rake surface, and a portion of the region passing through a perpendicular bisector of the first corner is located at a lowest position.

3. The cutting insert according to claim 1, wherein the third rake angle of the corner rake surface is larger than the first rake angle of the minor rake surface.

4. The cutting insert according to claim 1, wherein the connection angle of the connection surface is larger than the rake angle of the rake surface.

5. The cutting insert according to claim 1, wherein a width of the connection surface is decreased from the first corner to the second corner in a top view.

6. The cutting insert according to claim 1, wherein a width of the rake surface is decreased from the first corner to the second corner in a top view.

7. The cutting insert according to claim 1,
wherein the upper surface further comprises a planar upper mount part located more inward than the connection surface, and
wherein the upper mount part is located lower than any portion of the upper cutting edge in a side view.

8. The cutting insert according to claim 1, wherein an inclination angle of the minor cutting edge is smaller than an inclination angle of the major cutting edge.

9. The cutting insert according to claim 1, wherein the major cutting edge is recessed toward the lower surface in a side view.

10. The cutting insert according to claim 1, wherein the minor cutting edge has a straight line shape.

11. The cutting insert according to claim 1, further comprises a lower cutting edge located at an intersecting part of the lower surface and the side surface,
wherein the lower surface comprises a planar lower mount part, and one end portion of the lower mount part located close to the central axis is located closer to the upper surface than another end portion of the lower mount part located close to the lower cutting edge on the basis of the perpendicular plane.

12. The cutting insert according to claim 1,
wherein the upper surface alternately comprises equal to or more than two major corners, each having a first interior angle, and equal to more than two minor corners, each having a second interior angle larger than the first interior angle, and
wherein the equal to or more than two major corners comprises the first corner, and the equal to or more than two minor corners comprises the second corner.

13. The cutting insert according to claim 11, wherein the upper cutting edge sequentially comprises the corner cutting edge, the minor cutting edge, and the major cutting edge in a direction from a first major corner of the equal to or more than two major corners to each of a first minor corner and a second minor corner each being adjacent to the first major corner of the equal to or more than two minor corners.

14. A cutting tool, comprising:
a cutting insert according to claim 1; and
a holder configured to attach the cutting insert thereto,
wherein a cutting section of the upper cutting edge extending from the first corner to the second corner in the cutting insert has a positive axial rake angle.

15. A method of producing a machined product, comprising:
rotating a cutting tool according to claim 14 on a basis of a rotation axis of the holder;
bringing the upper cutting edge of the cutting tool being rotated into contact with a surface of a workpiece; and
separating the cutting tool from the workpiece.

* * * * *